(12) United States Patent
Wobben (10) Patent No.: US 7,794,209 B2
(45) Date of Patent: Sep. 14, 2010

(54) ROTOR BLADE FOR A WIND TURBINE

(76) Inventor: Aloys Wobben, Argestrasse 19, Aurich (DE) 26607

( * ) Notice: Subject to any disclaimer, the term of this patent is extended or adjusted under 35 U.S.C. 154(b) by 918 days.

(21) Appl. No.: 11/504,118

(22) Filed: Aug. 14, 2006

(65) Prior Publication Data

US 2009/0074583 A1 Mar. 19, 2009

Related U.S. Application Data (63) Continuation-in-part of application No. PCT/EP2005/050585, filed on Feb. 10, 2005.

(30) Foreign Application Priority Data

Feb. 13, 2004 (DE) .................. 10 2004 007 487

(51) Int. Cl.
*F03D 1/06* (2006.01)
(52) U.S. Cl. ................... 416/223 R; 416/238
(58) Field of Classification Search ................ None
See application file for complete search history.

(56) References Cited

U.S. PATENT DOCUMENTS

| | | | | |
|---|---|---|---|---|
| 2,576,981 | A | 12/1951 | Vogt ........................ 244/91 |
| 4,150,301 | A * | 4/1979 | Bergey, Jr. ............. 416/223 A |
| 4,245,804 | A | 1/1981 | Ishimitsu et al. ............. 244/91 |
| 4,329,115 | A | 5/1982 | Kress ......................... 416/11 |
| 4,408,958 | A | 10/1983 | Schacle ..................... 416/237 |
| 4,722,499 | A | 2/1988 | Klug ......................... 244/199 |
| 5,407,153 | A | 4/1995 | Kirk et al. .................. 244/199 |
| 5,562,420 | A * | 10/1996 | Tangler et al. .......... 416/223 R |
| 5,634,613 | A | 6/1997 | McCarthy |
| 6,068,446 | A * | 5/2000 | Tangler et al. .......... 416/223 R |
| 6,491,262 | B1 * | 12/2002 | Kota ......................... 244/219 |
| 2002/0179777 | A1 * | 12/2002 | Al-Garni et al. ............ 244/206 |
| 2007/0207033 | A1 * | 9/2007 | Appa et al. ................. 416/104 |

FOREIGN PATENT DOCUMENTS

| | | |
|---|---|---|
| DE | 830 627 | 2/1952 |
| DE | 38 25 241 A1 | 10/1989 |
| EP | 0 094 064 A1 | 11/1983 |
| GB | 612413 | 11/1948 |
| WO | WO 2004/067956 A1 | 8/2004 |

OTHER PUBLICATIONS

Shimizu, Y., et al., "New technology of power augmentation on horizontal axis wind turbines using Mie vanes," *Journal of Wind Engineering and Industrial Aerodynamics*, 39: 119-127, 1992.

(Continued)

*Primary Examiner*—Richard Edgar
(74) *Attorney, Agent, or Firm*—Seed IP Law Group PLLC (57) ABSTRACT

A rotor blade of a wind power installation in which the rotor blade, in particular in the central region of the rotor, the so-called main board, has a lift-drag ratio which in the region of about ±2° from the optimum pitch angle has a lift-drag ratio value of more than 80%, preferably 90% and more of the maximum value of the lift-drag ratio.

13 Claims, 10 Drawing Sheets

OTHER PUBLICATIONS

Gasch, "Windkraftanlagen", 1996, pp. 126-129.

Hau, "Windkraftanlagen", 1996, pp. 101-109.

Hau, Erich, "Wind Turbines: Fundamentals, Technologies, Application, Economics," Second Edition, Springer, Berlin, Germany, 2006, Chapter 5, "Rotor Aerodynamics," pp. 92-115 and Chapter 7, "Rotor Blades," pp. 219-252.

Alpman, Emre, "Airfoil Shape Optimization Using Evolutionary Algorithms," Graduate Research Paper, Pennstate University, University Park, PA.

* cited by examiner

ROTOR BLADE FOR A WIND TURBINE

BACKGROUND OF THE INVENTION

1. Field of the Invention

The present disclosure concerns a rotor blade of a wind power installation and a wind power installation comprising a rotor having such rotor blades.

2. Description of the Related Art

The performance of a wind power installation and in particular the efficiency thereof is determined to a not inconsiderable degree by the rotor blades or the rotor blade design. The rotor blades are described by a large number of parameters, in which respect attention is directed at this juncture generally as state of the art to the book by Erich Hau, Windkraftanlagen, 3rd edition, 2002, in particular pages 90 ff thereof.

BRIEF SUMMARY OF THE INVENTION

As mentioned the operational efficiency and also the regulating performance of wind power installations are governed to a not inconsiderable extent by the aerodynamic properties of the rotor blade profiles used. An important parameter of a rotor blade profile is characterized by the ratio of the lift coefficient $c_a$ and drag coefficient $c_w$:

$$\frac{c_a}{c_w} = E$$

wherein E is referred to as the lift-drag ratio.

In addition an important parameter of a rotor blade is the high-speed factor $\lambda$ wherein the high-speed factor is defined by the quotient of the peripheral speed (u) of the tip of the rotor blade and the wind speed v.

Figure 1:
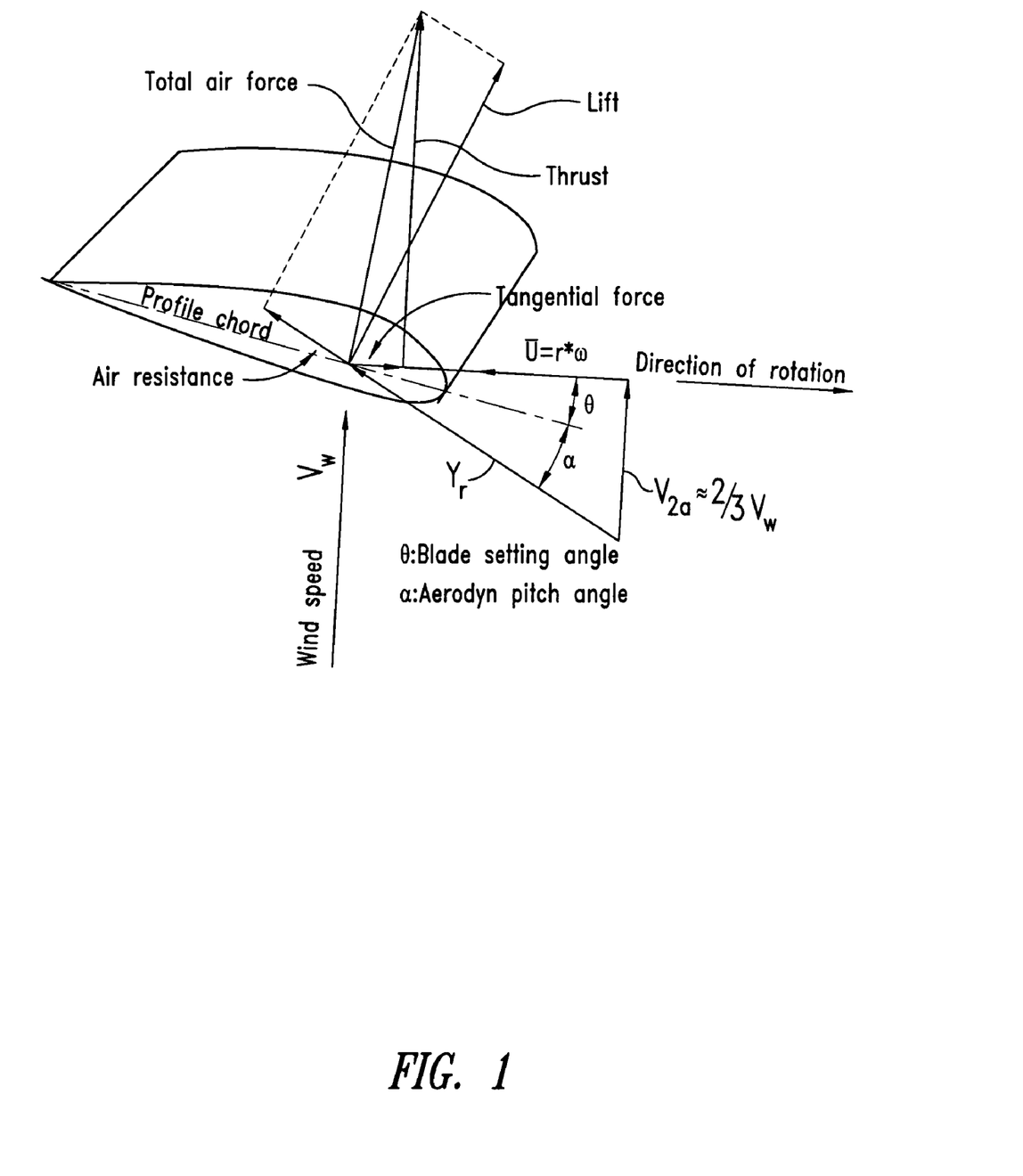
FIG. 1 shows the known afflux flow conditions and the air forces at the profile cross-section of a blade element.

FIG. 1 shows the known afflux flow conditions and the air forces at the profile cross-section of a blade element.

If the profiles of known rotor blades are investigated, a particular relationship between the lift-drag ratio and the pitch angle is established. More specifically it is found that the lift-drag ratio is greatly dependent on the respective pitch angle and typically a high lift-drag ratio is achieved only in a quite limited pitch angle range. Thus for example a high lift-drag ratio can be achieved if the pitch angle (of a rotor blade) is in the region of 6° and at the same time however the lift-drag ratio falls severely as soon as the pitch angle slightly rises above or falls below the region of 6°.

If the value leaves the region of the optimum lift-drag ratio, that is to say the pitch angle is markedly different from the optimum pitch angle, for example 6°, it can be easily seen that the overall efficiency of the installation is less with the consequence that the wind power installation will have a tendency either to set the pitch angle to the optimum values again, for example by pitch control, and/or to set the entire rotor into the wind in the optimum relationship by orientation of the pod.

The size of the rotors of wind power installations have steadily increased in recent years and swept rotor areas of 10,000 square meters are in the meantime no longer theory but have become practice, for example in the case of a wind power installation of type E112 from Enercon. That involves a wind power installation whose rotor diameter is about 112 m.

It is now in practice impossible to achieve the optimum of the lift-drag ratio over all regions of the rotor blade because, with the very large swept area, it is no longer possible to assume that the wind is always flowing against the rotor blade from the same direction and always at the same speed.

The consequence of this is that in some regions the rotor blade or blades admittedly operate in a relatively optimum manner but in some other regions the rotor blades rather operate in sub-optimum manner by virtue of the different nature of the afflux flow profile in the swept rotor area. That results directly from the very close dependency of the lift-drag ratio on the afflux angle and the consequence of this is that the loads on the rotor blade can fluctuate in an extreme fashion because the lift ($c_a$) of the rotor blade is also approximately proportional to the lift-drag ratio.

It will be appreciated that, as a way of improving the above-indicated problems and to avoid the disadvantages thereof, it is possible to always find an optimum setting by suitable pitch control of the rotor blades or by virtue of yaw of the entire rotor. It will be readily apparent to the man skilled in the art however that, with that concept, the rotor blades must in practice be constantly set into the wind (that is to say must be pitched) and/or the azimuth drives must also constantly freshly orient the rotor without that substantially improving the situation.

Figure 2:
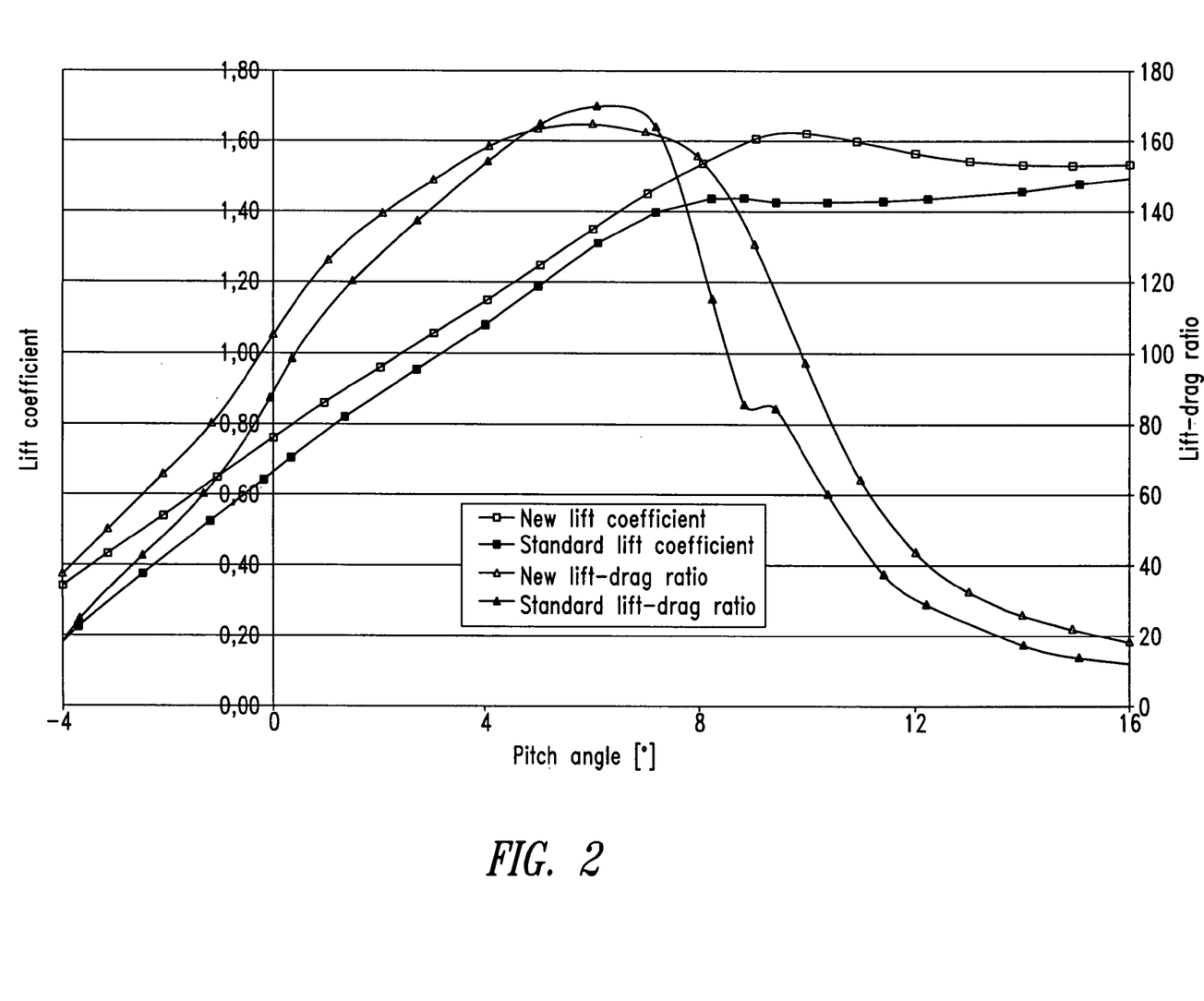
FIG. 2 is a graphical illustration of the variation of the lift coefficient or the lift-drag ratio on the one hand relative to the pitch angle.

In one embodiment, a rotor blade of a wind power installation in which the rotor blade, in particular in the central region of the rotor, the so-called, main board, has a lift-drag ratio which in the region of about ±2° from the optimum pitch angle has a lift-drag ratio value of more than 80%, preferably 90% and more of the maximum value of the lift-drag ratio. In one embodiment, the characteristic, curve of the lift-drag ratio is of a configuration in dependence on the pitch angle as shown in FIG. 2.

In one embodiment, a rotor blade having a tip or a tip end plate which rises out of the plane of the rotor blade in the manner of a winglet, wherein said end plate is turned about the thread axis in its central plane by about 4 to 8°, preferably 4 to 6°, particularly preferably about 5°.

In one embodiment, a rotor blade of a wind power installation comprises a rotor blade attachment region, a main board coupled to the rotor blade attachment region and configured to have a lift-drag ratio in a region of approximately ±2° from an optimum pitch angle of more than 80% of a maximum value of the lift-drag ratio, and a tip region coupled to the main board. In one embodiment, the lift drag ratio of the main board in the region of approximately ±2° from the optimum pitch angle is more than 90% of the maximum value of the lift-drag ratio. In one embodiment, a portion of the tip region rises out of a plane of the rotor blade and is turned about a thread axis in a central plane by approximately 4 to 8 degrees. In one embodiment, the portion of the tip is turned about the thread axis in the central plane by 4 to 6 degrees. In one embodiment, the portion of the tip is turned about the thread axis in the central plane by approximately 5 degrees.

DETAILED DESCRIPTION OF THE INVENTION

One of the properties of the rotor blade design according to an embodiment of the invention is that the lift-drag ratio remains virtually high over a quite large pitch angle range, but in that respect the highest value in respect of the lift-drag ratio now remains behind the optimum of the previous lift-drag ratio from the state of the art. Expressed in other terms, the lift-drag ratio of the rotor blade according to an embodiment of the invention, with optimum setting of the pitch angle is—at a maximum—lower than in the state of the art, but at the same time a departure from the optimum setting does not immediately lead to a substantial reduction in the lift-drag ratio and the lift coefficient and thus a loss of lift, but deviations which are in the range of for example ±0.5 to 3° from the optimum setting angle do not lead to the substantial reduction in the lift-drag ratio and thus the reduction in lift with the consequence that the overall blade efficiency is improved. That also achieves a markedly better distribution of load and a markedly low fluctuation in load ($\Delta L/dt$). As can be seen from FIG. 2 the 'saddle' of the lift-drag ratio curve of the rotor blade according to an embodiment of the invention in the range between 4 and 8° pitch angle is markedly wider than in the case of a known rotor blade.

The claimed design configuration of the rotor blade is to be found in particular in the central third of the rotor blade, that is to say in the main board of the rotor blade. That is the region which is between the rotor blade attachment region or rotor blade root region on the one hand and the tip region, that is to say the outer end region, of the rotor blade.

FIG. 2 shows the variation in the lift coefficient or the lift-drag ratio on the one hand relative to the pitch angle. In particular the curve diagrams relative to the pitch angle show that, in the case of a standard rotor blade, the lift-drag ratio reaches its absolute maximum which is at about 170 in the region of the pitch angle of about 6°. The lift-drag ratio already falls severely upon a departure from the pitch angle of 6° by 1°, that is to say either to 7° or 5°, and in particular towards higher pitch angles the lift-drag ratio is already halved when the pitch angle assumes a value of about 9°. Towards lower pitch angles there is also a very sharp drop which however is not quite as steep as when the pitch angle differs towards higher pitch angles.

The variation in the lift-drag ratio in the case of a rotor blade according to an embodiment of the invention can also be seen in the diagram. The maximum is once again pronounced in the region of the pitch angle of about 6° and that maximum is below the maximum of the lift-drag ratio in the case of a standard rotor blade. It will be noted however that the 'saddle' of the optimum is now markedly wider as can be seen from the intersecting curves and when for example the pitch angle is in the range of 4 to 8°, that is to say ±2° from the optimum pitch angle of 6°, the lift-drag ratio is reduced only by about 10% from its optimum value. In the region of about 4.5° to −4° on the one hand and in the region of about 7° to 16° the lift-drag ratio is above the lift-drag ratio curve for a known rotor blade.

As can also be seen the configuration of the rotor blade according to an embodiment of the invention overall improves the lift coefficient of the entire rotor blade, which is accompanied by an increase in efficiency of about 15% of the rotor blade.

In particular the load fluctuations are also now no longer as great as hitherto and, with any very small change in the pitch angle, there is no need to effect at the same time corresponding measures to re-set the pitch angle to the desired optimum value, in the present example 6°.

Figure 3A:
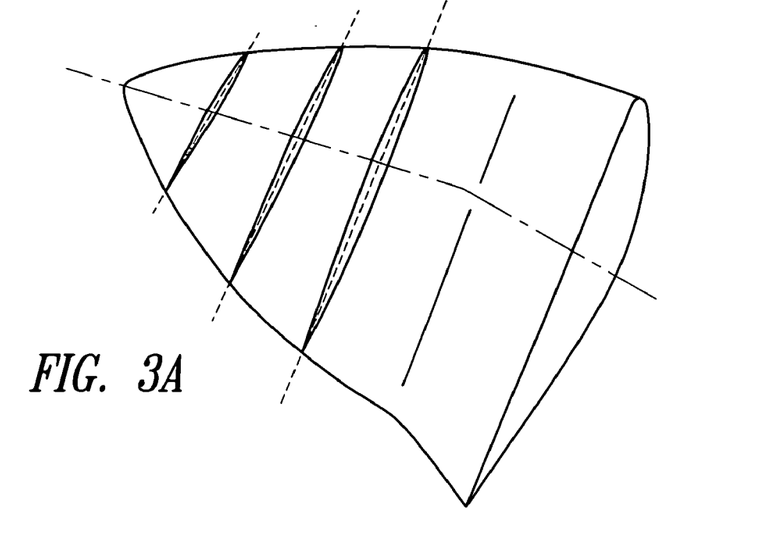
FIG. 3a shows a perspective view of an embodiment of a rotor blade tip.
Figure 3B:
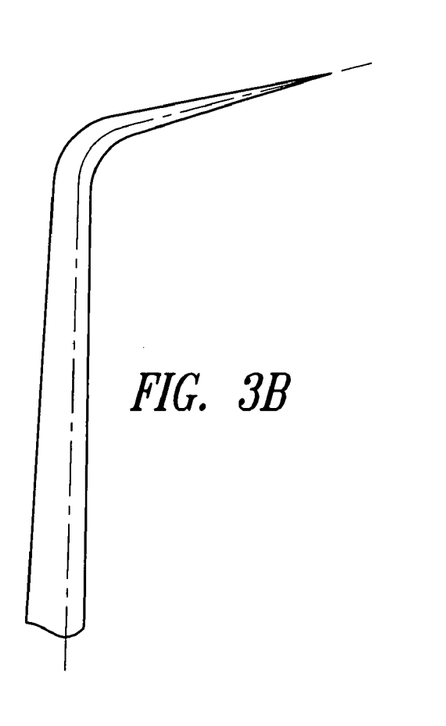
FIG. 3b shows a side view of an embodiment of a rotor blade tip.
Figure 3C:
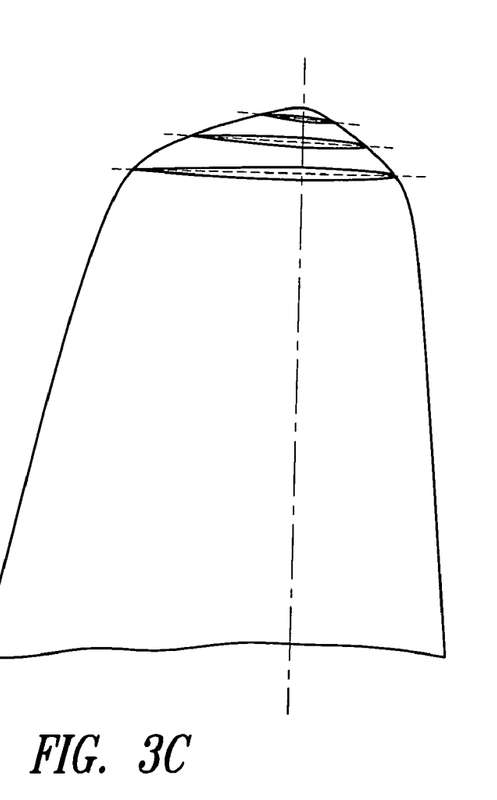
FIG. 3c shows a plan view of an embodiment of a rotor blade tip.
Figure 4:
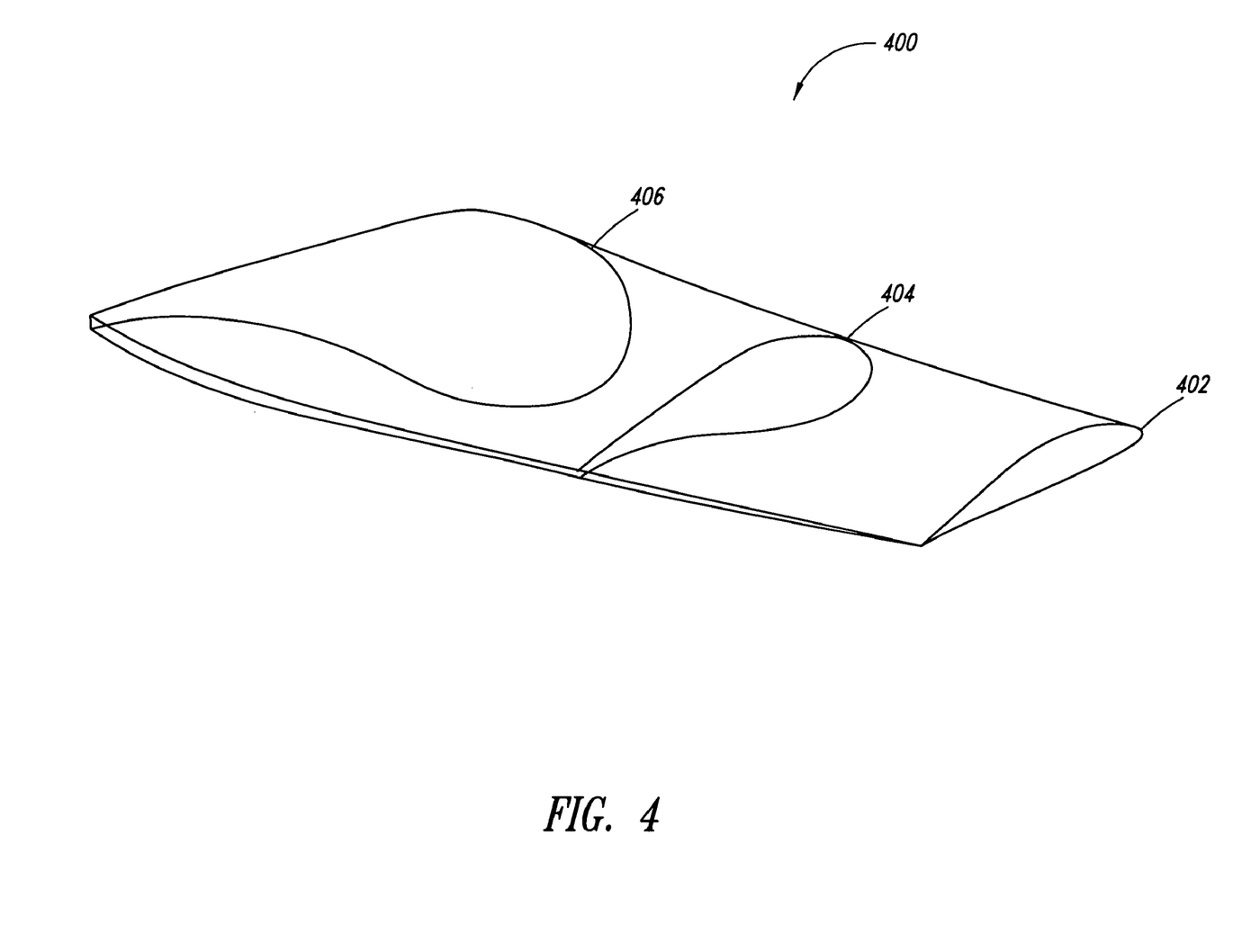
FIG. 4 shows an embodiment of a main board of a rotor blade.
Figure 5:
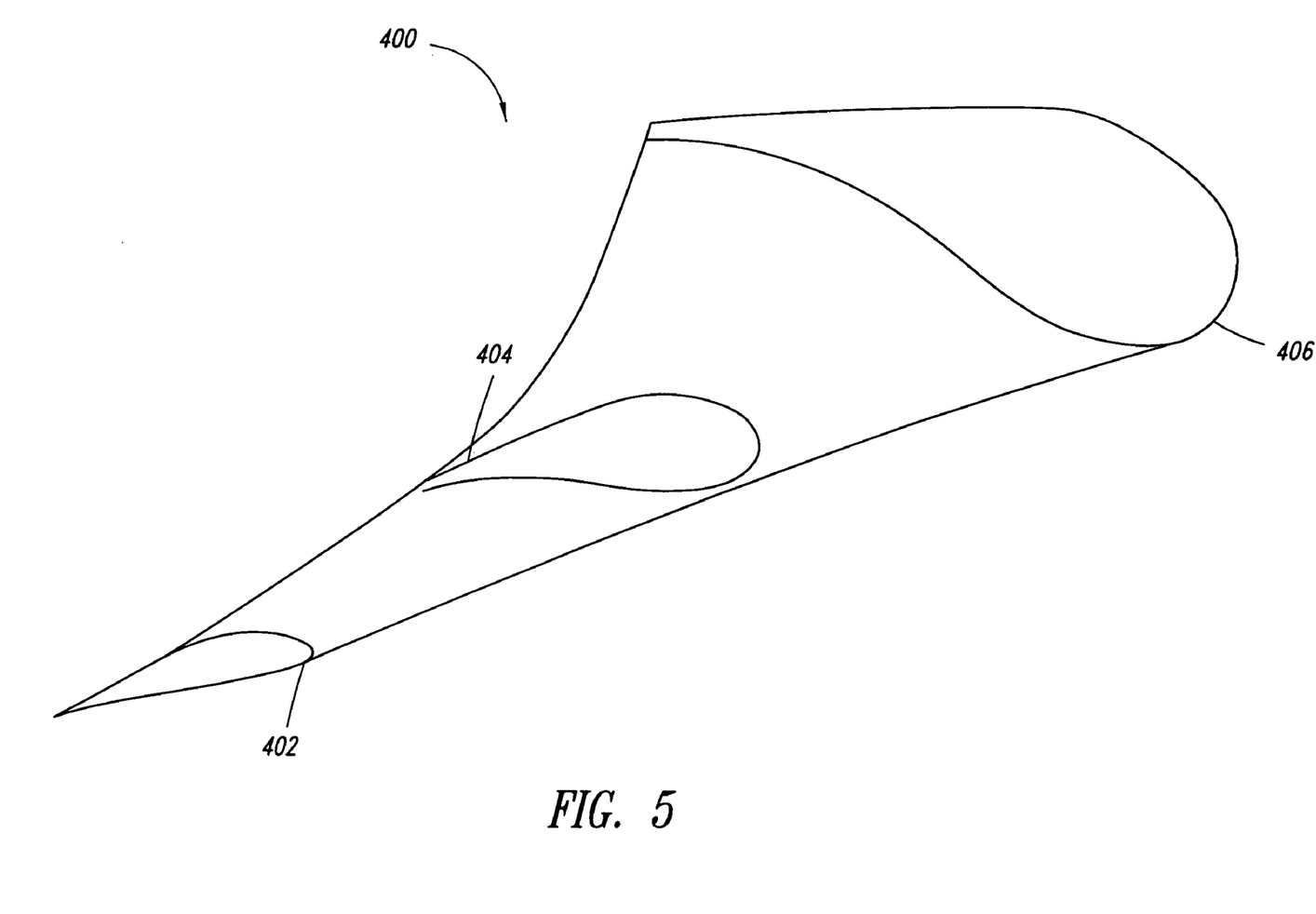
FIG. 5 is another view of the embodiment of a main board of a rotor blade illustrated in FIG. 4.
Figure 6:
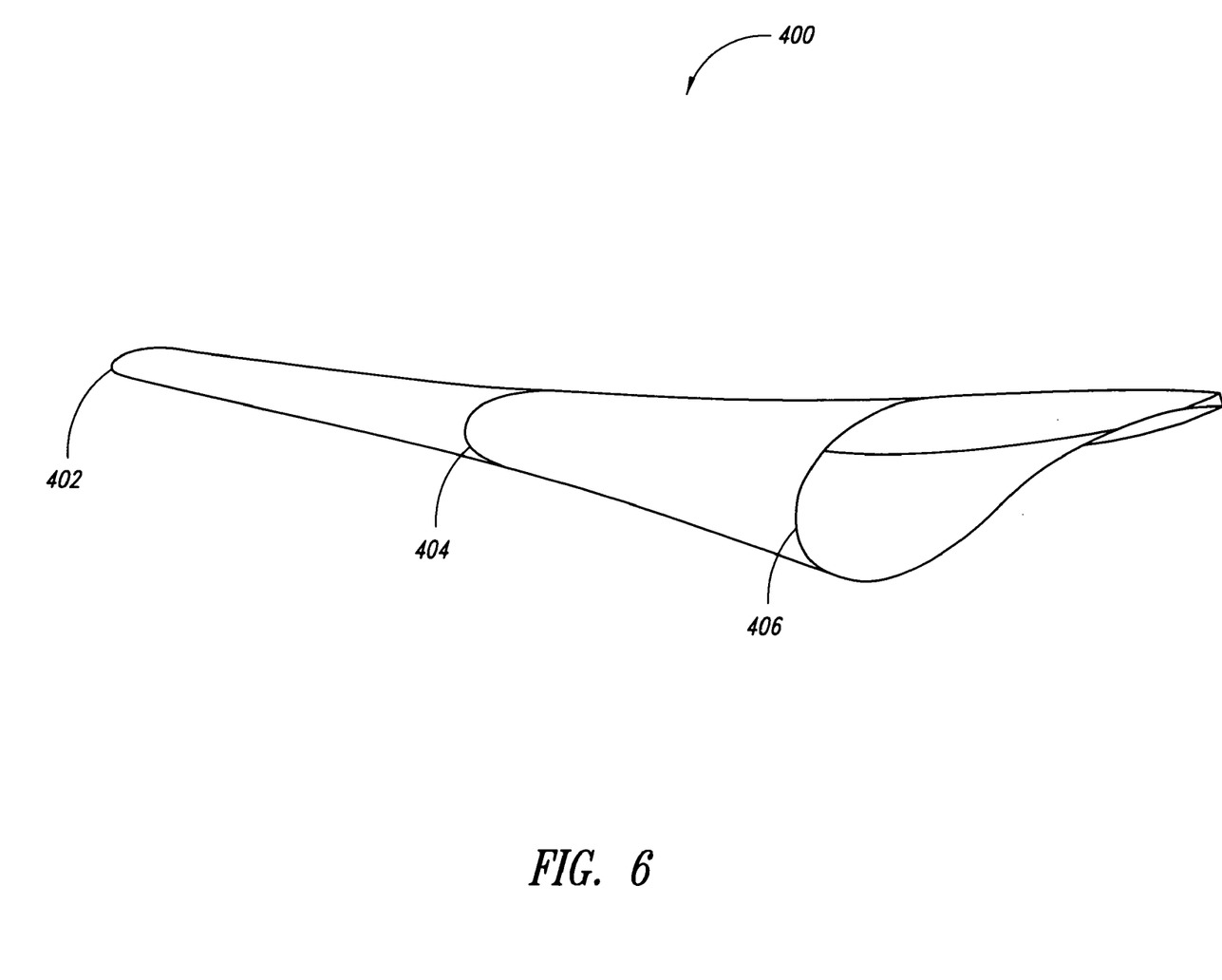
FIG. 6 is another view of the embodiment of a main board of a rotor blade illustrated in FIG. 4.
Figure 7:
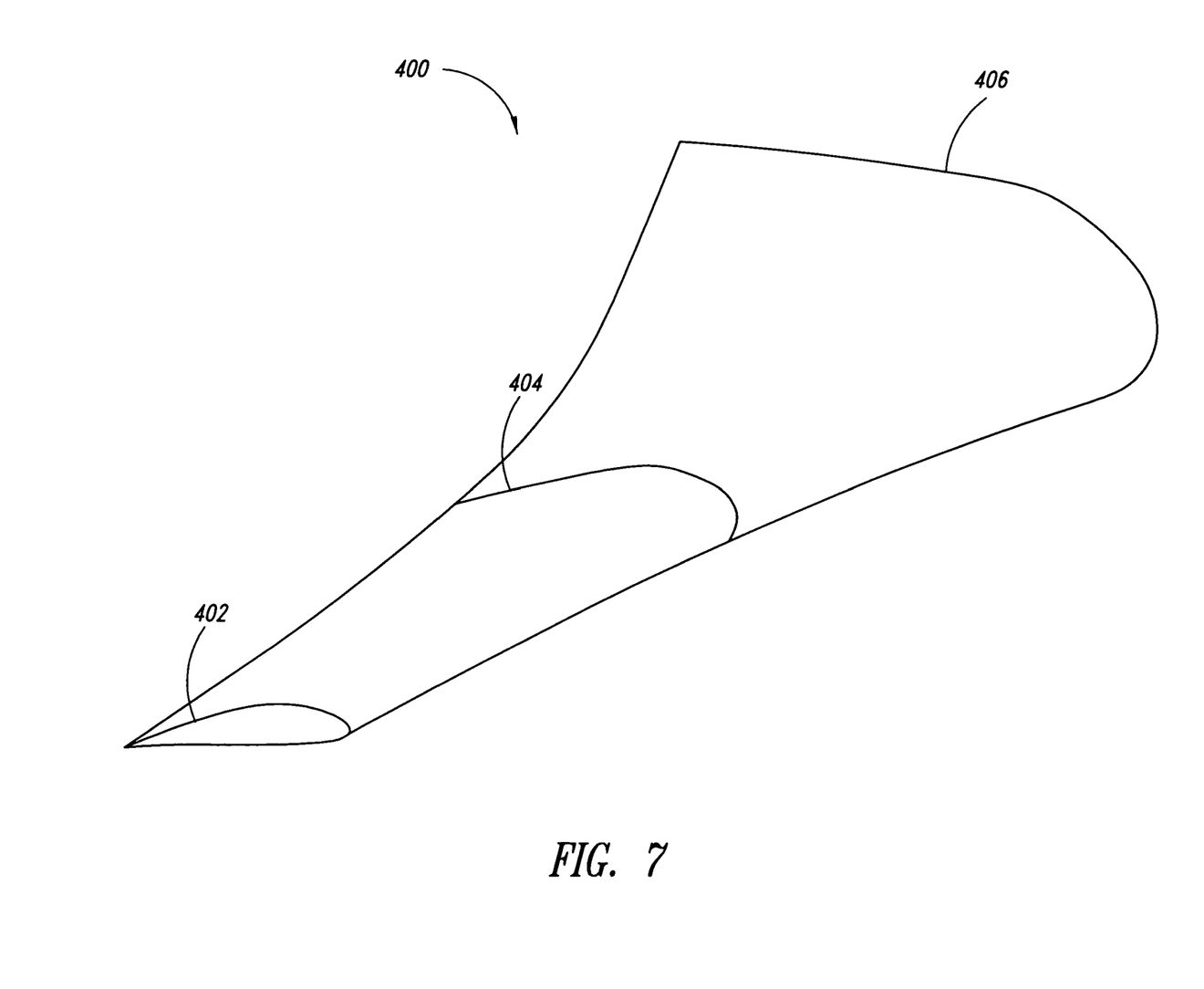
FIG. 7 is another view of the embodiment of a main board of a rotor blade illustrated in FIG. 4.
Figure 8:
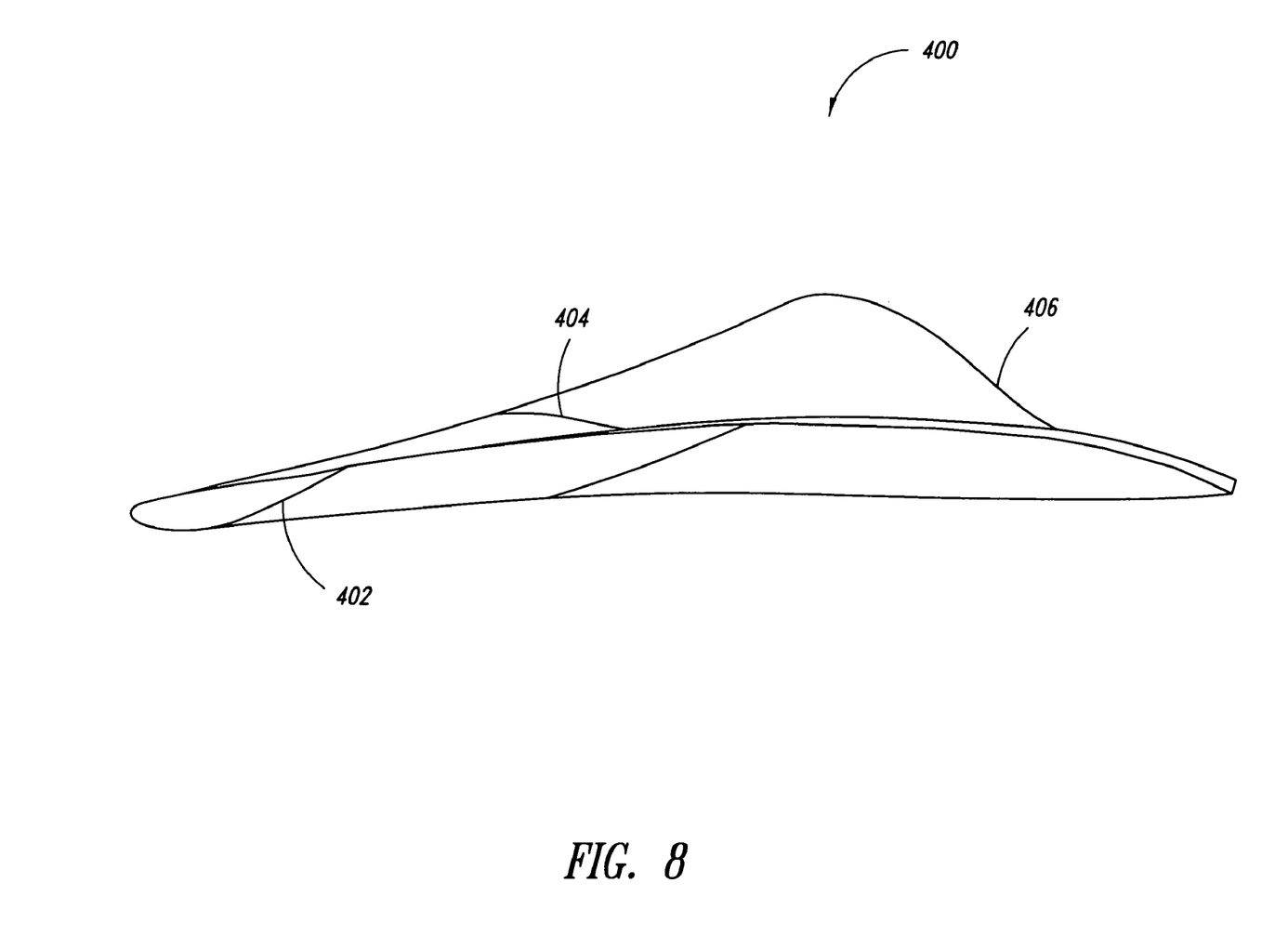
FIG. 8 is another view of the embodiment of a main board of a rotor blade illustrated in FIG. 4.

FIG. 3 shows various views of a rotor blade tip, that is to say a rotor blade end portion. FIG. 3a shows a perspective view of a rotor blade tip, FIG. 3b shows a side view and FIG. 3c shows a plan view.

That rotor blade tip is also usually referred to as an edge arc. It can be seen from FIG. 3a that the edge arc is illustrated with three profile sections and the thread axis.

The three different illustrations make it possible to show the rotation of the profile of the edge arc about the thread axis. In that respect the illustrated rotation is greater in terms of magnitude than the number of degrees specified in the description in order for reasons of illustration to make the representation in the illustration in the drawing perceptible at all to some degree.

It should be particularly emphasized once again at this juncture that the configuration according to an embodiment of the invention of the rotor blade concerns in particular the central portion, that is to say the so-called main board, that is to say the region which is between the rotor blade root region and the tip region. The main board can also be described generally as the 'central third' of a rotor blade, in which respect the specific dimensions over the main board can differ therefrom and the main board for example can also occupy approximately up to 60% of the rotor blade length.

Additionally or independently of the aforementioned configuration of the rotor blade, a further improvement can also be achieved—see FIGS. 3a to 3c—if the rotor blade tip, that is to say the tip end portion, is rotated in a given region around the thread axis, for example through about 4 to 8°, preferably about 5°, around the thread axis (twist). The twist is then in a neutral afflux angle, that is to say the tip itself affords no contribution to lift. A typical configuration of a tip or a corresponding tip end section is known from the above-mentioned book by Erich Hau, page 126 (FIG. 535).

In accordance with the general school of thought the dimensioning loads of a rotor blade are calculated as the product of the square of the wind speed, the rotor blade area and the lift coefficient. Expressed as a formula the $$\text{dimensioning load} = v_2 \times A \times c_A,$$

wherein the rotor area A is used to denote the area which the rotor covers (sweeps).

This in consideration of the textbooks is quite rough and does not always correspond to reality. The greatest load of a rotor blade does not act thereon in normal operation but when a so-called once-in-50-years gust 'catches' the rotor blade from the side. In that case the gust acts on precisely the entire rotor blade surface. In that respect it can be seen straightaway that the lift coefficient $c_A$ plays no part, rather the resistance coefficient $c_W$ would be considered here. The resistance coefficient however is always constant for that more or less flat rotor blade surface for, if the wind impinges on a blade, then it impinges precisely on a board. That situation, namely full lateral afflux flow, is the worst-case situation in which the greatest load for which the rotor blade must be dimensioned, precisely a dimensioning load, occurs.

It will be apparent from the foregoing that, with a constant resistance coefficient, it is simply and solely the area of the rotor blade that is crucial. That is also the reason for the slenderest possible configuration of the rotor blades.

It is however known that the power output of a wind power installation crucially depends on the length of the rotor blades. Therefore long slender blades are hitherto to be preferred to wide short blades. It will be noted however that the point is not to be overlooked in that respect that this consideration does not apply to the blade inner region (main board) as here the situation is fundamentally different.

Finally the relative speed of the rotor blade relative to the air flowing therearound in the region of the blade root is the lowest and rises continuously towards the blade tip. Therefore the rotor blade shape of an embodiment described herein with the narrow outer region and the optimized lift-drag ratio is a particularly advantageous solution.

Figure 9:
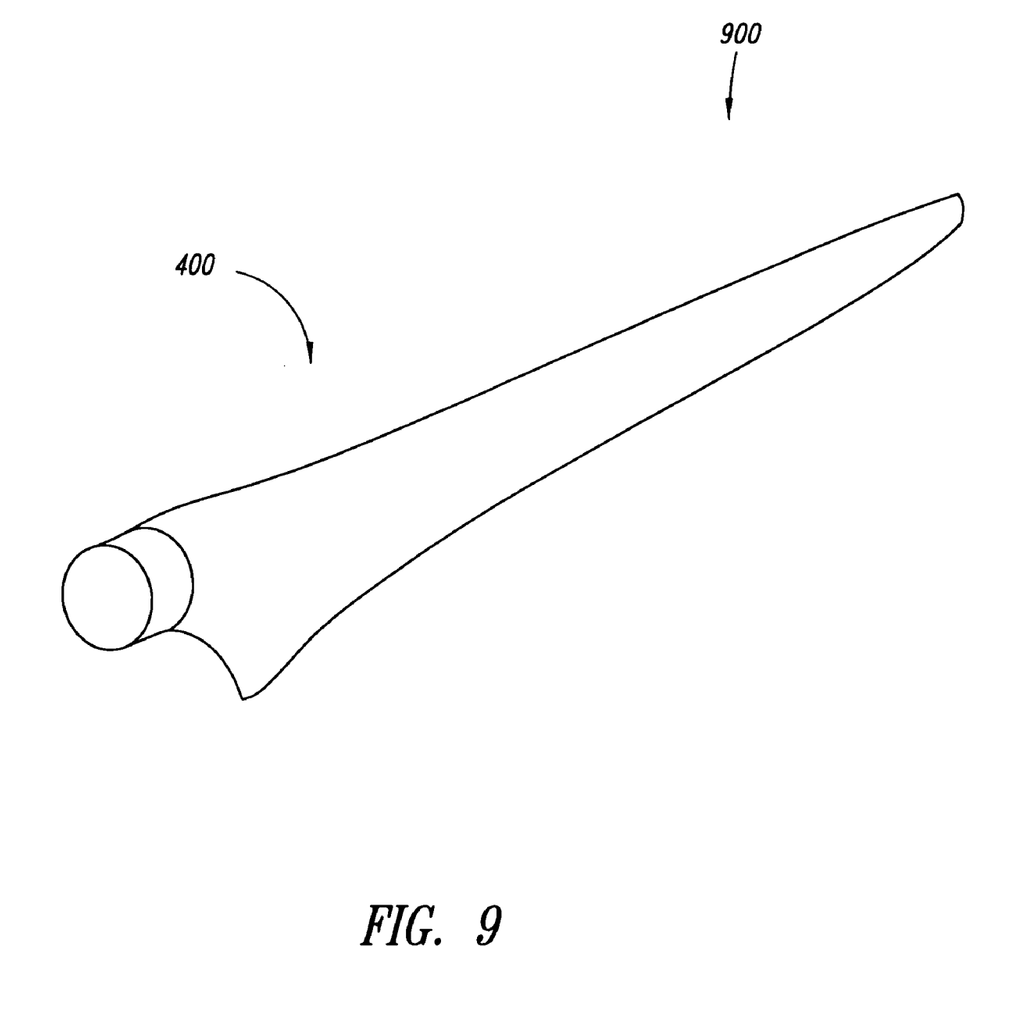
FIG. 9 shows an embodiment of a rotor blade incorporating the embodiment of a main board illustrated in FIG. 4.
Figure 10:
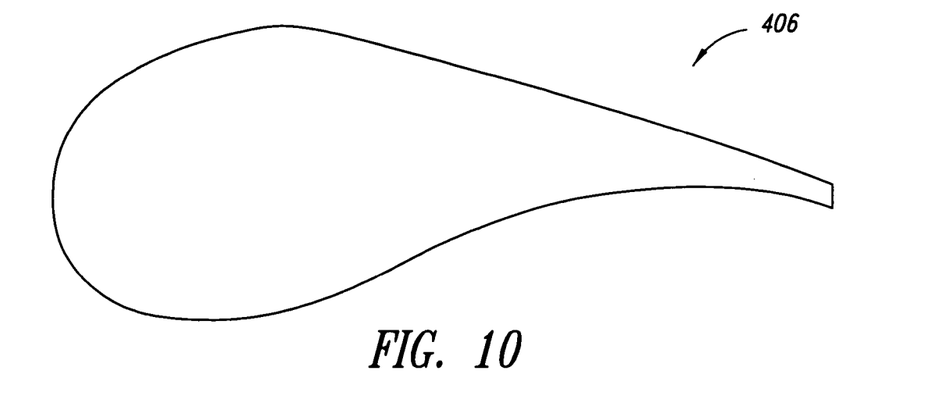
FIG. 10 shows a first cross-section of the embodiment of a main board illustrated in FIG. 4.
Figure 11:
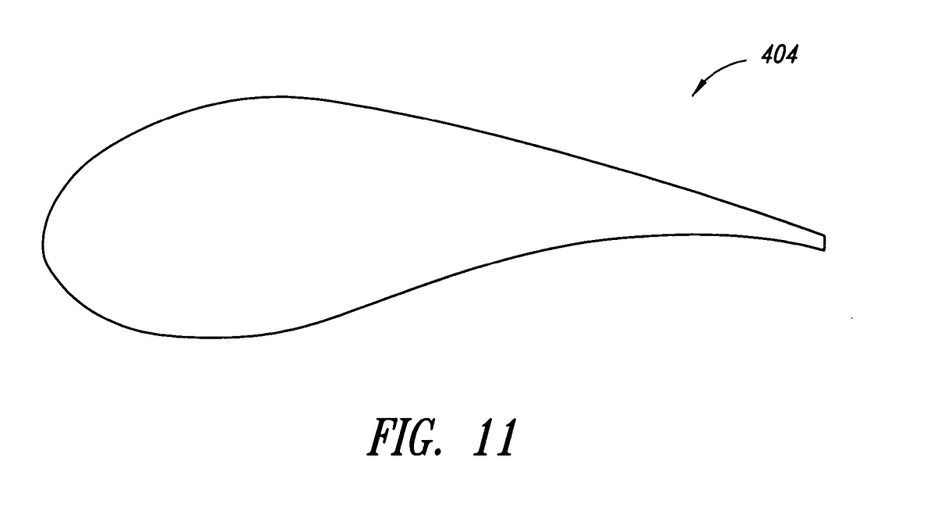
FIG. 11 shows a second cross-section of the embodiment of a main board illustrated in FIG. 4.
Figure 12:
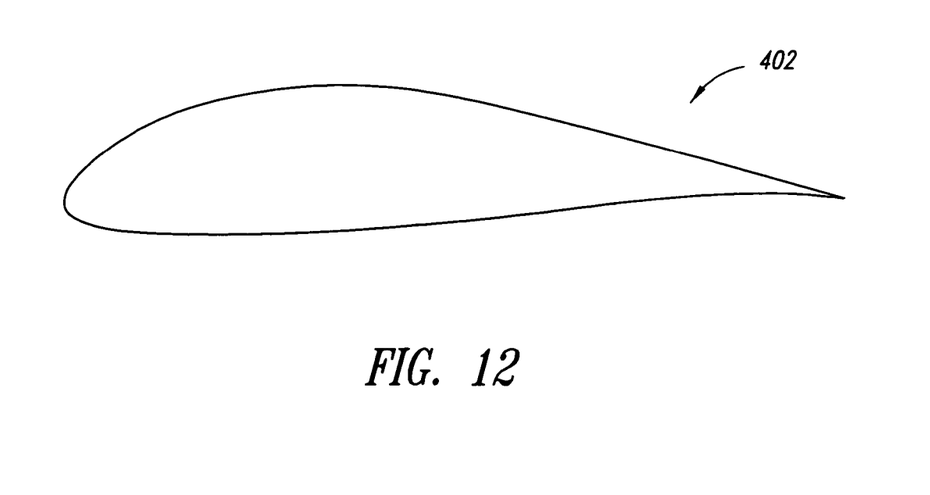
FIG. 12 shows a third cross-section of the embodiment of a main board illustrated in FIG. 4.

FIGS. 4-8 illustrates an embodiment of a main board 400 of a rotor blade in accordance with the present disclosure. Three cross-sections 402, 404, 406 of the main board 400 are illustrated in FIGS. 4-8 as contrasting lines. FIG. 9 illustrates a rotor blade 900 incorporating the embodiment of a main board 400 illustrated in FIG. 4. FIG. 10 illustrates an embodiment of a cross section 406 of the rotor blade 400 illustrated in FIG. 4. FIG. 11 illustrates an embodiment of another cross section 404 of the rotor blade 400 illustrated in FIG. 4. FIG. 12 illustrates an embodiment of another cross section 402 of the rotor blade 400 illustrated in FIG. 4. In one embodiment, the cross section 402 is located at a radius of 23.075 meters on the rotor blade and has a depth of 1.923 meters with a blade setting angle (See FIG. 1) of 2.5 degrees and a relative thickness of 17.65%, the cross-section 404 is located at a radius of 14.2 meters and has a depth of 2.373 meters with a blade setting angle of 8.65 degrees and a relative thickness of 28%, and the cross-section 406 is located at a radius of 5.325 meters and has a depth of 3.904 meters with a blade setting angle of 28.55 degrees and a relative thickness of 36.77%.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A rotor blade of a wind power installation, the rotor blade comprising:
    a rotor blade root region;
    a rotor blade tip region; and
    a rotor blade central region between the root and tip regions, the rotor blade central region comprising at least a central third of the rotor blade, wherein the rotor blade has, at least in the central region of the rotor blade, an aerodynamic profile which is configured such that a ratio of a lift coefficient to a drag coefficient has a maximum value at an optimum pitch angle and exceeds 80% of the maximum value for pitch angles in a region of about ±2° from the optimum pitch angle, whereby a configurable maximum value for the ratio of the lift coefficient to the drag coefficient is traded in for a broader range of efficiency for the pitch angle.

2. A rotor blade according to claim 1 wherein the ratio of the lift coefficient to the drag coefficient exceeds 90% of the maximum value for pitch angles within a range of about ±2° from the optimum pitch angle.

3. The rotor blade of claim 1 wherein the tip region rises out of a plane of the rotor blade in the manner of a winglet and an end portion of the tip region is rotated about a thread axis in a central plane.

4. The rotor blade of claim 3 wherein a rotational angle of the thread axis is between 4 degrees and 8 degrees.

5. The rotor blade of claim 4 wherein the rotational angle of the thread axis is between 4 degrees and 6 degrees.

6. The rotor blade of claim 4 wherein the rotational angle of the thread axis is 5 degrees.

7. A rotor blade of a wind power installation, comprising:
    a rotor blade attachment region;
    a main board coupled to the rotor blade attachment region and configured to have an aerodynamic profile with a lift-drag ratio in a region of approximately ±2° from an optimum pitch angle of more than 80% of a maximum value of the lift-drag ratio, wherein the optimum pitch angle is a pitch angle where the maximum value of the lift-drag ratio is obtained; and
    a tip region coupled to the main board.

8. The rotor blade of claim 7 wherein lift drag ratio of the main board in the region of approximately ±2° from the optimum pitch angle is more than 90% of the maximum value of the lift-drag ratio.

9. A method of manufacturing a rotor blade of a wind power installation, the method comprising:
    defining a rotor blade root portion, a rotor blade tip portion and a rotor blade central portion between the root and tip portions; and
    configuring the central portion to have an aerodynamic profile with a lift-drag ratio in a range of approximately ±2° from an optimum pitch angle of more than 80% of a maximum value of the lift-drag ratio, wherein the optimum pitch angle is a pitch angle where the maximum value of the lift-drag ratio is obtained; and
    coupling together the rotor blade root portion, rotor blade tip portion and rotor blade central portion.

10. The method of claim 9 wherein lift drag ratio of the central portion in the range of approximately ±2° from the optimum pitch angle is more than 90% of the maximum value of the lift-drag ratio.

11. The method of claim 9 wherein part of the tip portion rises out of a plane of the rotor blade and is turned about a thread axis in a central plane by approximately 4 to 8 degrees.

12. The method of claim 11 wherein the part of the tip portion is turned about the thread axis in the central plane by 4 to 6 degrees.

13. The method of claim 11 wherein the part of the tip portion is turned about the thread axis in the central plane by approximately 5 degrees.

* * * * *